(12) United States Patent
Weiss et al.

(10) Patent No.: US 9,694,808 B2
(45) Date of Patent: Jul. 4, 2017

(54) METHOD FOR A VEHICLE HAVING AN ELECTRIC MACHINE

(75) Inventors: Norbert Weiss, Sickte (DE); Vasoontara Thiamtong, Wolfsburg (DE); Richard Auer, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 72 days.

(21) Appl. No.: 14/118,842

(22) PCT Filed: May 9, 2012

(86) PCT No.: PCT/EP2012/001984
§ 371 (c)(1),
(2), (4) Date: Nov. 19, 2013

(87) PCT Pub. No.: WO2012/156043
PCT Pub. Date: Nov. 22, 2012

(65) Prior Publication Data
US 2015/0142230 A1 May 21, 2015

(30) Foreign Application Priority Data
May 19, 2011 (DE) .................. 10 2011 101 992

(51) Int. Cl.
*B60W 20/00* (2016.01)
*B60W 20/40* (2016.01)
(Continued)

(52) U.S. Cl.
CPC ...... *B60W 20/40* (2013.01); *B60W 30/18054* (2013.01); *B60W 30/18127* (2013.01);
(Continued)

(58) Field of Classification Search
CPC ......... B60W 20/40; B60W 20/30; B60T 7/12; Y10S 903/902
See application file for complete search history.

(56) References Cited

U.S. PATENT DOCUMENTS

| 6,321,144 | B1 | 11/2001 | Crombez |
| 7,957,873 | B2 * | 6/2011 | Cawthorne ............. F16H 61/18 |
| | | | 701/22 |

(Continued)

FOREIGN PATENT DOCUMENTS

| CN | 101 966 822 A | 2/2011 |
| DE | 199 21 918 C2 | 11/2000 |

(Continued)

OTHER PUBLICATIONS

International Search Report for International Application No. PCT/EP2012/001984 mailed Aug. 20, 2012.

*Primary Examiner* — Jerrah Edwards
(74) *Attorney, Agent, or Firm* — Pearl Cohen Zedek Latzer Baratz LLP

(57) ABSTRACT

The present invention relates to a method for a vehicle (10) having an electric machine (11). The electric machine (11) is coupled to at least one wheel (16) of the vehicle (10). The vehicle (10) can optionally be operated in at least a first operating mode (21) and a second operating mode (22). In the first operating mode (21), the electric machine (11) applies a torque to the wheel (16), and in the second operating mode (22) the electric machine (11) does not apply any torque to the wheel (16). In the method, a request for switching over between the first and the second operating modes (21, 22) is detected and the vehicle (10) is operated in a transition operating mode (23) if the request to switch over from the first operating mode (21) into the second operating mode (22) is detected. In the transmission operating mode (23), a torque is applied to the at least one wheel (16) counter to a rolling direction of the vehicle (10) for at least a predetermined time.

13 Claims, 2 Drawing Sheets

(51) Int. Cl.
  *B60W 30/18* (2012.01)
  *B60W 10/08* (2006.01)
  *B60W 10/184* (2012.01)

(52) U.S. Cl.
  CPC ..... *B60L 2240/80* (2013.01); *B60L 2270/145* (2013.01); *B60W 10/08* (2013.01); *B60W 10/184* (2013.01); *B60W 2510/101* (2013.01); *B60W 2540/12* (2013.01); *B60W 2540/16* (2013.01); *B60W 2710/083* (2013.01); *B60W 2710/182* (2013.01); *B60W 2720/30* (2013.01); *Y02T 10/7258* (2013.01)

(56) References Cited

U.S. PATENT DOCUMENTS

| | | | |
|---|---|---|---|
| 8,092,340 B2* | 1/2012 | Song | B60K 6/36 477/15 |
| 2005/0182543 A1 | 8/2005 | Sah et al. | |
| 2008/0221763 A1* | 9/2008 | Cawthorne | F16H 61/18 701/62 |
| 2010/0048352 A1* | 2/2010 | Yamamoto | 477/92 |
| 2010/0076634 A1* | 3/2010 | Brigham | 701/22 |
| 2010/0204892 A1* | 8/2010 | Kobayashi | F16H 61/20 701/51 |
| 2011/0009235 A1* | 1/2011 | Song | B60K 6/36 477/3 |
| 2011/0045947 A1 | 2/2011 | Kaltenbach et al. | |
| 2015/0266480 A1* | 9/2015 | Kuroki | F02D 41/045 477/174 |

FOREIGN PATENT DOCUMENTS

| | | |
|---|---|---|
| DE | 10 2005 006 371 A1 | 9/2005 |
| DE | 10 2007 055 785 A1 | 6/2009 |
| DE | 10 2008 053 505 A1 | 4/2010 |
| EP | 2 055 546 A1 | 5/2009 |
| WO | WO 98/31559 | 7/1998 |
| WO | WO 02/085661 A1 | 10/2002 |
| WO | WO 2012/055258 | 5/2012 |

* cited by examiner

METHOD FOR A VEHICLE HAVING AN ELECTRIC MACHINE

CROSS-REFERENCE TO RELATED APPLICATIONS

This application is a National Phase Application of PCT International Application No. PCT/EP2012/001984, International Filing Date May 9, 2012, claiming priority of German Patent Application No. 10 2011 101 992.1, filed May 19, 2011, which is hereby incorporated by reference.

BACKGROUND OF THE INVENTION

The present invention relates to method for a vehicle with an electric motor, especially to a method for an electric vehicle or a hybrid vehicle, as well as to such a vehicle.

In a vehicle with an electric motor as the drive motor such as, for example, an electric vehicle or a hybrid vehicle, the behavior and operating conditions differ from those of a vehicle with an internal combustion engine as the drive engine. This especially pertains, for instance, to the operation at low vehicle speeds since an electric motor can fundamentally be operated at any desired low motor speeds, whereas an internal combustion engine can usually only be operated within a range above a predetermined idling speed. Another example is overrun operation, during which a different deceleration can occur in an electric vehicle due to recuperation. Since most car drivers are only used to the behavior of vehicles with internal combustion engines, the driver of an electric car or of a hybrid car might be confused by the different behavior, or else dangerous situations might even arise due to this different behavior. For this reason, the state of the art discloses various methods to make the behavior of a vehicle with an electric drive similar to the behavior of a vehicle with an internal combustion engine.

For example, German patent application DE 10 2007 055 785 A1 discloses a method for controlling the inching mode of operation of a vehicle with a hybrid drive so as to allow an efficient inching operation that is largely unlimited in time but that is nevertheless reliable, whereby an electric power storage unit is utilized as little as possible. For this purpose, a power train essentially comprises an internal combustion engine, an electric motor, a shifting element arranged between the internal combustion engine and the electric motor, a transmission and a driven element. When the internal combustion engine is running, primarily the shifting element is employed to effectuate the inching operation, while secondarily, the electric motor is employed as a function of the monitoring of prescribed operating parameters of the shifting element.

German patent specification DE 199 21 918 C2 relates to a parking lock for a vehicle with an electric drive. The parking lock comprises a mechanical and an electrical component. Upon actuation of the parking lock, the mechanical component is mechanically put in operative connection with an electric power train in order to stop its rotational movement. The electrical component is configured in such a way that, when the parking lock is about to be actuated, the electrical component can generate a short circuit, at least temporarily, in a stator winding of the electric motor.

German patent application DE 10 2008 053 505 A1 relates to a method for controlling a hybrid power train of a motor vehicle in order to achieve a smooth behavior of the wheel torque when the clutch is engaged and disengaged. The clutch is arranged in a hybrid power train and has a clutch input and output. On the clutch input side, the hybrid power train has an internal combustion engine while on the clutch output side, the hybrid power train has a transmission as well as at least one electric motor. Once a synchronous speed range has been reached between the clutch input and the clutch output, the clutch is abruptly engaged.

In vehicles with an electric motor as the drive motor, for example, electric cars or hybrid cars, for the sake of efficiency, the electric motor is frequently coupled to the driven axle directly, without a disconnect-type clutch. This means that a driver cannot physically separate the drive from the driven elements (axle and wheel) by means of a disconnect-type clutch, as is the case in a vehicle with an internal combustion engine. Nevertheless, even in vehicles with an electric drive motor, a gearshift lever is normally available to the driver which, similar to an automatic transmission, has at least the gearshift lever positions "D" for drive, "R" for reverse and "N" for neutral or for a "safe state" in which no torque is being transmitted from the drive motor to the wheels. Consequently, a driver who wants to select a torque-free state in the drive of the vehicle can do so in the usual way by setting the gearshift lever to "N". This function in an electrically driven vehicle in combination with the fact that, in an electrically driven vehicle, braking torques are effectively applied onto the wheels by means of the electric motor via recuperation torques leads to the situation that, when the car is shifted from "D" or "R" to "N", this braking torque has to be eliminated. The shift from "D" or "R" to "N" can occur, for instance, during maneuvering or during normal driving. If the vehicle is moving during the shifting or if the brake of the vehicle is simultaneously activated during the shifting, the driver experiences the elimination of the braking torque as if it were an acceleration since the overall deceleration effect is diminished. The driver can perceive this as unpleasant or confusing and this might pose a safety hazard in critical situations.

SUMMARY OF THE INVENTION

Before this backdrop, the objective of the present invention is to put forward an improved operation of a vehicle with an electric drive motor.

This objective is achieved by means of a method for a vehicle with an electric motor and a vehicle according to the independent claims. The dependent claims define preferred and advantageous embodiments of the present invention.

According to the present invention, a method is put forward for a vehicle with an electric motor. The electric motor is coupled to at least one wheel of the vehicle. The electric motor can drive or brake the wheel, or else it can have no influence on it, depending on the mode of operation that has been selected. The vehicle can be operated as desired at least in a first mode of operation and in a second mode of operation. The first mode of operation is, for example, a gear setting for driving the vehicle forward or in reverse, while the second mode of operation is, for instance, a gear setting for the freewheeling of at least one wheel of the vehicle that is coupled to the electric motor. In other words, the first mode of operation is, for example, the gear setting "D" or "R", while the second mode of operation is the gear setting "N" of the gearshift lever of the vehicle. Other modes of operation or gear settings can be present, but these will not be elaborated upon in the context given below. In the first mode of operation, the electric motor applies a torque onto the at least one wheel, while in the second mode of operation, the electric motor does not apply a torque onto the at least one wheel. The torque applied onto the at least one wheel in the first mode of operation is, for instance, a torque for driving the vehicle in a forward or reverse direction, or else a so-called overrun torque which acts opposite to the direction of movement of the vehicle. The overrun torque can be converted by means of the electric motor, for example, into electric energy, which can then be fed to an energy storage unit of the vehicle. Such an overrun torque is also referred to as the recuperation torque. In the method according to the invention, a request to shift between the first and second modes of operation is detected, that is to say, a request to shift, for example, from "D" to "N" or a request to shift from "R" to "N" is detected. Once the request to shift from the first mode of operation into the second mode of operation has been detected, the vehicle is driven in a transition mode of operation. In the transition mode of operation, a torque is applied onto the at least one wheel, at least for a predetermined period of time. The torque of the transition mode of operation acts opposite to the direction of movement of the vehicle. In other words, after a request to shift, for example, from "D" to "N" or to shift from "R" to "N", the vehicle does not immediately shift into the second mode of operation in which no torque is applied onto the at least one wheel, but rather, it first shifts into a transition mode of operation in which a torque opposite to the direction of movement of the vehicle is applied onto the at least one wheel for a predetermined period of time. The term "at least one wheel" can refer to, for instance, exactly one wheel of the vehicle if the vehicle has, for example, several electric motors that are each associated with precisely one wheel, or else the term "at least one wheel" can refer to, for instance, two wheels of one axle of the vehicle or to all of the wheels of the vehicle, if the two wheels of one axle or all of the wheels of the vehicle are coupled to the electric motor by means of an appropriate transmission and drive shafts.

Since the vehicle is not shifted directly from the first mode of operation into the second mode of operation, but rather, is initially shifted from the first mode of operation into a transition mode of operation in which a torque opposite to the direction of movement of the vehicle is applied onto the at least one wheel, at least for a predetermined period of time, then, for example, in the case of a quick shift from "D" to "R" via "N" or from "R" to "D" via "N", a recuperation torque present in the first mode of operation is also briefly maintained in "N", so that the driver does not experience any unexpected reduction in the braking effect. Moreover, in the case of an unintentional shifting from "D" to "N" or from "R" to "N", the driver is given enough time to build up a braking torque that at least matches the recuperation torque in the previous mode of operation "D" or "R" by increasing the braking pressure onto the regular hydraulic brake during the transition mode of operation.

According to one embodiment, during the transition mode of operation, it is also ascertained whether the predetermined period of time has expired and, if it has been ascertained that this is the case, then the vehicle is operated in the second mode of operation. The predetermined period of time is, for instance, one second at the maximum. If the predetermined period of time for the transition mode of operation is, for instance, one second at the maximum, and if the vehicle is subsequently shifted automatically into the second mode of operation provided that no other request was made to shift into a different mode of operation the second mode of operation can be reached safely and reliably within an acceptable period of time. Since in the transition mode of operation only a torque opposite to the direction of movement of the vehicle is applied onto the wheel, in comparison to direct shifting into the second mode of operation—in which no torque is applied onto the wheel—it is possible to avoid hazardous situations that might arise due to the unexpected cessation of a braking or recuperation torque.

According to one embodiment, the vehicle is only operated in the transition mode of operation if a request to shift from the first mode of operation into the second mode of operation has been detected and if, in addition, the torque applied by the electric motor acts opposite to a direction of movement of the vehicle in the first mode of operation. Thus, the transition mode of operation is only employed if the vehicle has already applied a braking or recuperation torque onto the at least one wheel in the first mode of operation, that is to say, in "D" or "R". In contrast, if the vehicle was accelerated by the electric motor in the first mode of operation, or if the vehicle was moving in the first mode of operation without a braking or recuperation torque, then, after a request to shift between the first mode of operation and the second mode of operation, the vehicle is immediately shifted into the second mode of operation, that is to say, a thrust torque that might be present is not retained, but rather, it is immediately eliminated. This translates into a behavior of the vehicle that the driver would expect.

According to another embodiment, the vehicle is only operated in the transition mode of operation if a request to shift from the first mode of operation into the second mode of operation has been detected and if, at the same time, the brake pedal of the vehicle is actuated. If the driver, for instance, is maneuvering into a parking spot or is approaching a red light, it can happen that, while the brake of the vehicle is being actuated, the vehicle is supposed to shift from the first mode of operation into the second mode of operation, in other words, the gearshift lever is moved, for example, from "D" to "N". Since a recuperation torque normally acts on the at least one wheel when the brake pedal is actuated in the first mode of operation, this braking torque would be absent if the vehicle shifts directly into the second mode of operation, thus eliminating some of the braking effect of the vehicle. Therefore, in order to ameliorate this critical situation, the vehicle is at first operated in the transition mode of operation, in which a torque opposite to the direction of movement of the vehicle continues to be applied onto the at least one wheel.

According to another embodiment, in the transition mode of operation, the torque is applied by the electric motor onto the at least one wheel. As an alternative or in addition to this, in the transition mode of operation, the torque can be applied onto the at least one wheel by a brake device of the vehicle, for example, by a hydraulic brake device. The torque can be set, for instance, as a function of the torque in the first mode of operation. When the torque is applied by the electric motor, the energy thus obtained can be fed back to an energy storage unit of the vehicle via the electric motor, as a result of which energy can be saved and the range of the vehicle can be increased. The use of the brake device of the vehicle in the transition mode of operation allows the torque to be set to the desired value quickly and precisely. By setting the torque in the transition mode of operation as a function of the torque in the first mode of operation, it is possible to achieve a smooth torque transition between the first mode of operation and the transition mode of operation. Moreover, the torque in the transition mode of operation can be set as a function of the torque in the first mode of operation and of a predetermined maximum recuperation torque.

According to another embodiment, the torque in the transition mode of operation can have a predetermined torque curve. The predetermined torque curve can encompass a first portion with an essentially constant torque and a second portion with a torque whose magnitude decreases. In this manner, for instance, a recuperation torque that was applied in the first mode of operation onto the at least one wheel can be slowly phased out, so that the reduction of the braking torque after the shifting remains manageable for the driver. Owing to the first portion with an essentially constant torque, a brief temporary request to shift into the second mode of operation, for instance, when the vehicle shifts from driving forward to driving in reverse, in other words, from "D" via "N" to "R", can be carried out with changing the torque and thus smoothly.

According to another embodiment, in the transition mode of operation, the electric motor applies the torque opposite to the direction of movement of the vehicle onto the at least one wheel. The torque is set as a function of the position of the brake pedal of the vehicle. Thus, for instance, in the transition mode of operation, the response of the driver when the torque is set can be taken into consideration. For example, the magnitude of the torque applied by the electric motor can be reduced if the driver increases the pressure onto the brake pedal. In this manner, the driver can be provided with a comfortable transition between the first mode of operation and the second mode of operation.

According to the present invention, a vehicle is also being put forward that comprises an electric motor, an operating element and a control device. The electric motor is coupled to at least one wheel of the vehicle. The operating element serves to detect a request to shift between a first mode of operation and a second mode of operation of the vehicle. The operating element is, for example, a gearshift lever for shifting between a driving mode of operation, for instance, forward or reverse (typically the gearshift lever settings "D" or "R"), and a freewheeling mode of operation or neutral mode of operation (typically the gearshift lever setting "N"). The control device is coupled to the electric motor and to the operating element. The control device is configured to control the electric motor in such a way that, in the first mode of operation, the electric motor applies a torque onto the at least one wheel and, in the second mode of operation, it does not apply any torque onto the at least one wheel. When a request to shift from the first mode of operation into the second mode of operation is detected, the control device operates the vehicle in a transition mode of operation in which a torque is applied onto the at least one wheel, at least for a predetermined period of time. In the transition mode of operation, the torque applied onto the at least one wheel acts opposite to the direction of movement of the vehicle. The vehicle can be, for instance, an electric vehicle or a hybrid vehicle that is driven by the electric motor. According to one embodiment, the vehicle is configured to carry out the method described above and consequently, it also entails the advantages described in conjunction with the method.

BRIEF DESCRIPTION OF THE DRAWINGS

The present invention is explained in greater detail below with reference to the accompanying figures on the basis of preferred embodiments.

DETAILED DESCRIPTION OF THE INVENTION

Figure 1:
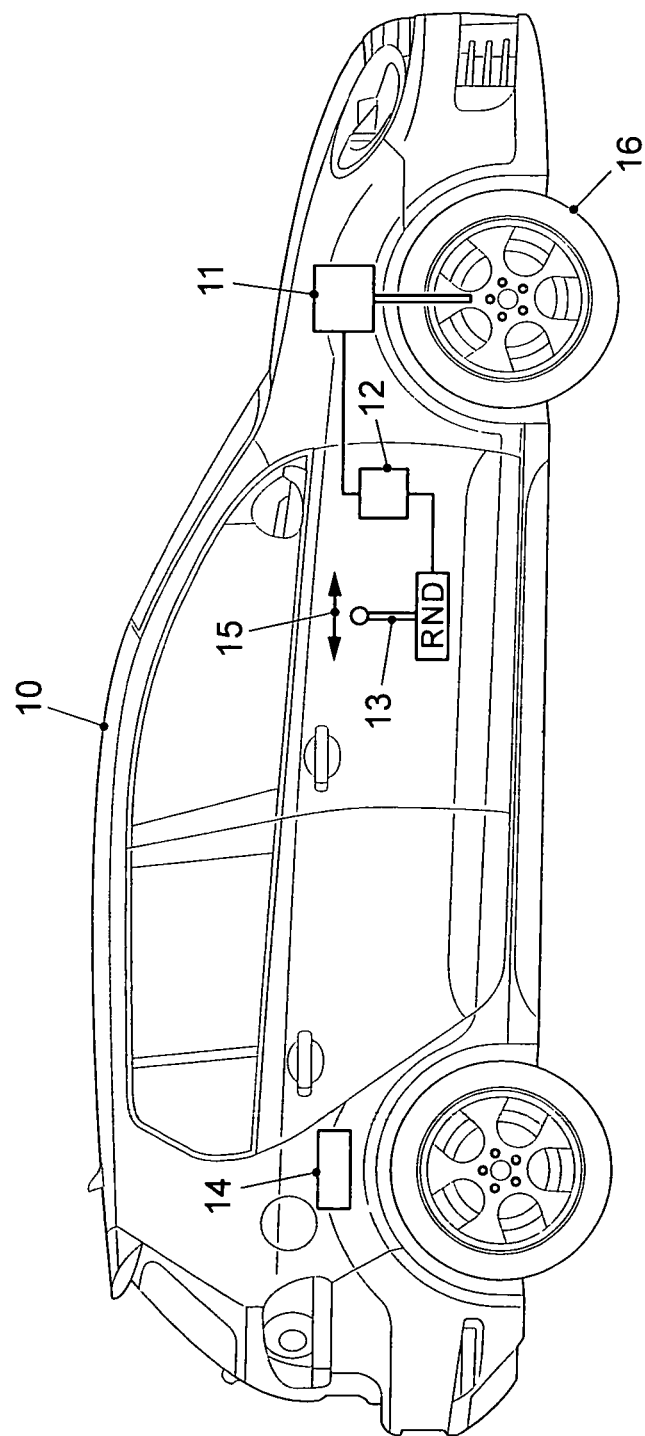
FIG. 1: a schematic view of a vehicle according to an embodiment of the present invention.

FIG. 1 shows a vehicle 10 having an electric motor 11, a control device 12, a gearshift lever 13 and an electric energy storage unit 14. The electric motor 11 is coupled, for example, to the front wheels 16 of the vehicle 10 and it is capable of applying a torque with a driving or braking effect onto the wheels 16. In order to drive the wheels 16, the electric motor 11 withdraws energy from the electric energy storage unit 14 and, when the wheels 16 are braked by the electric motor 11, the electric motor 11 can feed electric energy back into the electric energy storage unit 14. The gearshift lever 13 has three driving settings "R", "N" and "D", which can be selected in that a user of the vehicle moves the gearshift lever 13 in the direction of the arrow 15. The gearshift lever 13 can have other setting options, for instance, a position "P" for parking the vehicle. In the description of the present invention, however, only the above-mentioned settings "R", "N" and "D" are used.

Figure 2:
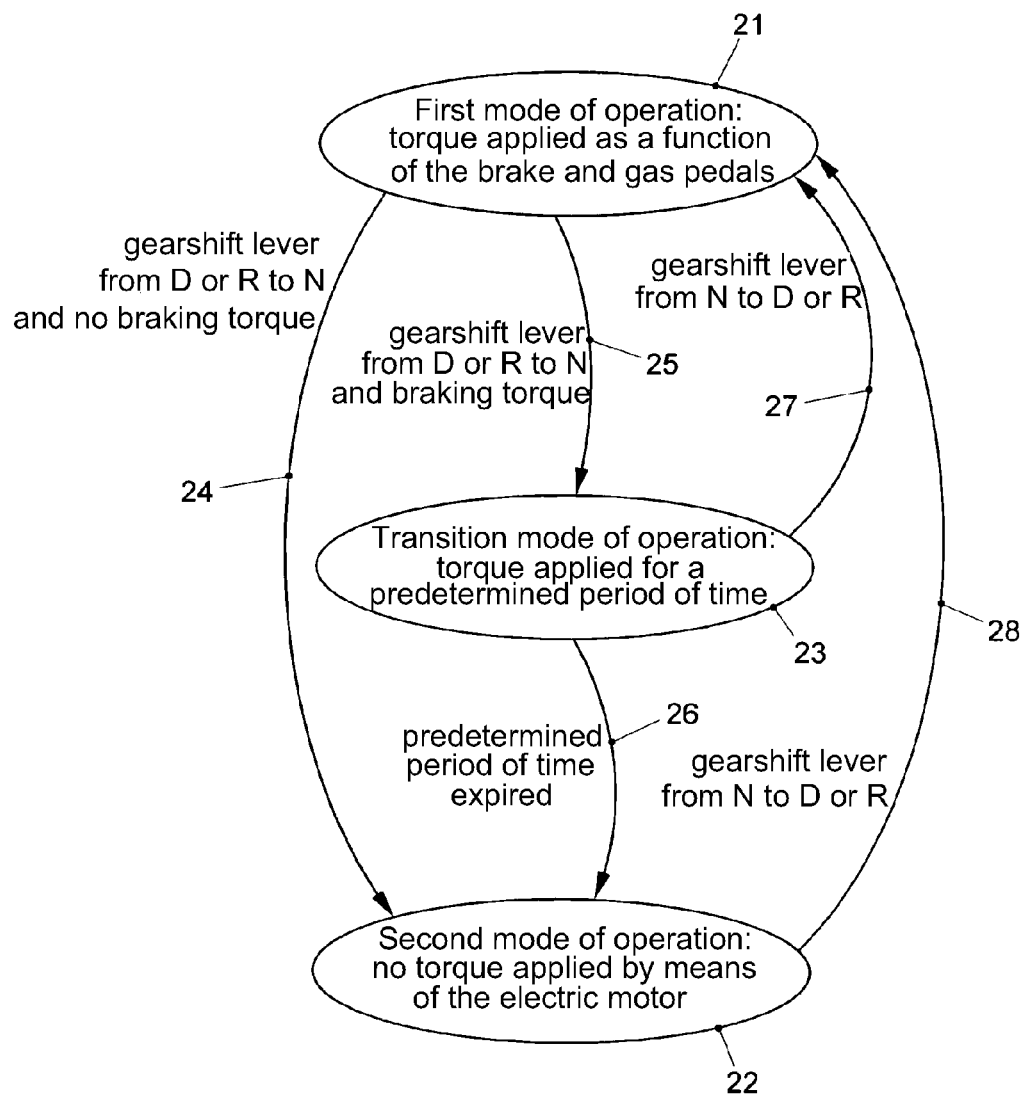
FIG. 2: a state diagram of a method according to an embodiment of the present invention.

The mode of functioning of the vehicle 10 will be described below in conjunction with FIG. 2. According to FIG. 2, the vehicle 10 can be operated in three modes of operation 21, 22 and 23. Operation in one of the modes of operation 21 to 23 is controlled by the control unit 12. The control unit 12 can be, for instance, part of the motor control system of the vehicle 10. In the first mode of operation 21, as a function of a brake pedal and a gas pedal of the vehicle, both of which can be actuated by a user of the vehicle, a torque is applied by the electric motor 11 onto the wheels 16 when the gearshift lever 13 is in position "D" or "R". In position "D", a torque is applied onto the wheels 16 in a forward driving direction of the vehicle, and in position "R", a torque is applied onto the wheels 16 in the reverse driving direction of the vehicle 10. When the brake pedal is actuated in the first mode of operation, a braking torque is applied by the electric motor 11 onto the wheels 16 opposite to the direction of movement of the vehicle. Additionally, when the brake pedal is actuated, for example, by means of a hydraulic brake of the vehicle 10, an additional braking torque can be applied onto the wheels 16 opposite to the direction of movement of the vehicle. The braking torque that is applied by the electric motor 11 onto the wheels 16 can be used by the electric motor 11 to generate electric energy that is fed back to the electric energy storage unit 14. For this reason, this braking torque is also referred to as the recuperation torque.

When, starting from the first mode of operation 21, the gearshift lever is moved from "D" or "R" to "N" and no braking torque is present on the wheels 16, the vehicle is operated in the second mode of operation 22 (transition 24). In this mode of operation, which is also referred to as the idling mode of operation or the neutral mode of operation, the electric motor 11 does not apply any torque onto the wheels 16. Consequently, the wheels 16 are freewheeling.

When the gearshift is moved in the first mode of operation from "D" or "R" to "N" and a braking torque is present on the wheels 16, the vehicle is operated in the transition mode of operation 23 (transition 25). As described above, the braking torque can comprise a recuperation torque or a braking torque of a brake system of the vehicle or a combination thereof. In the transition mode of operation 23, the electric motor 11 and/or the brake system of the vehicle 10 applies a braking torque onto the wheels 16 for a predetermined period of time. Details regarding the braking torque in the transition mode of operation will be described below. Once the predetermined period of time has expired, the vehicle is operated in the second mode of operation 22 as described above (transition 26). When the gearshift lever is moved from "N" to "D" or "R" in the transition mode of operation, the transition mode of operation is discontinued and the vehicle is operated in the first mode of operation 21

(transition 27). When the gearshift lever is moved from "N" to "D" or "R" in the second mode of operation, the vehicle is operated in the first mode of operation 21 (transition 28).

As described above, in the transition mode of operation 23, a braking torque or recuperation torque is also briefly maintained in the gearshift lever position "N" in order to either bridge a quick shift from "D" to "R" or from "R" to "D" via "N", or else, in the case of a shift to "N" without a further shift to "D" or "R", to give the driver time to effectuate a deceleration by increasing the pressure on the regular hydraulic brake, said deceleration then occurring due to the elimination of the braking or recuperation torque during a shift to "N". Therefore, for a predetermined period of time, a braking or recuperation torque is retained, also in the gearshift lever position "N", which is then phased out during or at the end of the predetermined period of time. A thrust torque during a shift from "D" or "R" to "N" is not retained, but rather, always immediately eliminated.

In the transition mode of operation 23, the braking torque for the predetermined period of time can be set, for instance, as follows:

1) During the predetermined period of time, a recuperation torque can be set to a prescribed maximum recuperation torque or to the preceding recuperation torque in the first mode of operation 21 (gearshift lever position "R" or "D").

2) In the predetermined period of time, a recuperation torque having a predetermined phase-out course can be set. The phase-out course can be optimized, for example, in that a short stay in "N" remains unnoticed and a longer stay in "N" remains manageable for the driver.

3) A recuperation torque can be set that corresponds to a recuperation torque that has previously been set by means of the brake pedal in the first mode of operation 21. Adjustable idling torques that are applied when neither the brake pedal nor the gas pedal is actuated would not be taken into account in this case, but rather only the recuperation torque set by means of the brake pedal. If the brake pedal was not actuated in the first mode of operation 21, consequently no braking torque would be applied in the transition mode of operation, but instead, during the shifting from "D" or "R" to "N", an idling torque would be immediately eliminated in the first mode of operation if the brake pedal is not actuated.

4. Adjustable idling torques of the first mode of operation 21 or a braking torque owing to actuation of the brake in the first mode of operation 21 are taken over by the brake system of the vehicle, for example, an electro-hydraulic brake booster, in order to create the braking deceleration anticipated by the driver.

Therefore, the braking torque or the recuperation torque set in the transition mode of operation causes an acceleration of the vehicle opposite to the direction of movement of the vehicle. In a manner of speaking, this always translates into a decrease in the speed.

The invention claimed is:

1. A method for operating an electric motor of a vehicle, which is coupled to at least one wheel of the vehicle, wherein the vehicle is configured to operate at least in a first mode of operation and in a second mode of operation, wherein, in the first mode of operation, the electric motor is configured to apply a first torque onto the at least one wheel thus moving the vehicle in a first direction, and wherein, in the second mode of operation, the electric motor is configured to apply no torque onto the at least one wheel thus allowing the at least one wheel to move freely, wherein the method comprises the following steps:

detecting a movement of a shift lever of the vehicle between a position of the first mode of operation and a position of the second mode of operation while a braking torque is present, once the shift lever has been moved from a position of the first mode of operation to a position of the second mode of operation, operating the vehicle in a transition mode of operation, wherein, in the transition mode of operation, the electric motor is configured to apply onto the at least one wheel a second torque that acts opposite to the first direction of the vehicle for at least a predetermined period of time, ascertaining whether the predetermined period of time has expired, and if the predetermined period of time has expired, operating the vehicle in the second mode of operation.

2. The method according to claim 1, wherein the predetermined period of time is one second at the maximum.

3. The method according to claim 1, wherein
the vehicle is configured to operate in the transition mode of operation only if a request to shift the vehicle from the first mode of operation into the second mode of operation has been detected, and
the torque applied by the electric motor acts opposite to a direction of movement of the vehicle in the first mode of operation.

4. The method according to claim 1, wherein the vehicle is configured to operate in the transition mode of operation only if a request to shift the vehicle from the first mode of operation into the second mode of operation has been detected and if the brake pedal of the vehicle is actuated.

5. The method according to claim 1, wherein the first mode of operation comprises a gear setting for driving the vehicle forward (D) or in reverse (R).

6. The method according to claim 1, wherein the second mode of operation comprises a gear setting for the freewheeling (N) of at least one wheel of the vehicle that is coupled to the electric motor.

7. The method according to claim 1,
wherein, in the transition mode of operation, the electric motor is configured to apply the second torque onto the at least one wheel, and
wherein the torque is set as a function of the first torque in the first mode of operation and of a predetermined maximum recuperation torque.

8. The method according to claim 1,
wherein the second torque in the transition mode of operation has a predetermined torque curve, and
wherein the predetermined torque curve encompasses a first portion with an essentially constant torque and a second portion with a torque whose magnitude decreases.

9. The method according to claim 1,
wherein, in the transition mode of operation, the electric motor is configured to apply the second torque onto the at least one wheel, and
wherein the second torque is set as a function of the position of the brake pedal of the vehicle.

10. The method according to claim 1, wherein, in the transition mode of operation, the second torque is also applied onto the at least one wheel by a brake device of the vehicle, whereby the second torque is set as a function of the first torque in the first mode of operation.

11. The method according to claim 1, wherein the electric motor is configured to generate electric energy when the torque applied by the electric motor onto the at least one wheels acts opposite to the direction of movement of the vehicle.

12. The method according to claim 1, wherein the electric motor is coupled directly to the at least one wheel without a disconnect-type clutch.

13. A vehicle comprising:
an electric motor that is coupled to at least one wheel of the vehicle,
an operating element configured to shift between a position of a first mode of operation and a position of a second mode of operation mode of operation of the vehicle, and
a control device that is coupled to the electric motor and to the operating element,
wherein the control device is configured to operate the electric motor in such a way that, in the first mode of operation, the electric motor is configured to apply a first torque onto the at least one wheel thus moving the vehicle in a first direction and wherein, in the second mode of operation, the electric motor is configured to apply no torque onto the at least one wheel thus allowing the at least one wheel to move freely,
wherein:
when a movement of the operating element from the position of the first mode of operation into the position of the second mode of operation is detected while a braking torque is present, the control device is configured to operate the vehicle in a transition mode of operation,
in the transition mode of operation, the electric motor is configured to apply onto the at least one wheel a second torque that acts opposite to the first direction of the vehicle for at least a predetermined period of time,
ascertaining whether the predetermined period of time has expired, and
if the predetermined period of time has expired, the vehicle is operated in the second mode of operation.

* * * * *